(12) United States Patent
Rambure

(10) Patent No.: US 11,125,506 B2
(45) Date of Patent: Sep. 21, 2021

(54) VERTICAL TUBE HEAT EXCHANGER AND METHOD FOR EXCHANGING HEAT

(71) Applicant: TECHNIP FRANCE, Courbevoie (FR)

(72) Inventor: Nicolas Rambure, Herblay (FR)

(73) Assignee: TECHNIP FRANCE, Courbevoie (FR)

( * ) Notice: Subject to any disclaimer, the term of this patent is extended or adjusted under 35 U.S.C. 154(b) by 298 days.

(21) Appl. No.: 16/321,346

(22) PCT Filed: Jul. 26, 2017

(86) PCT No.: PCT/EP2017/068836
§ 371 (c)(1),
(2) Date: May 6, 2019

(87) PCT Pub. No.: WO2018/019865
PCT Pub. Date: Feb. 1, 2018

(65) Prior Publication Data
US 2019/0264983 A1    Aug. 29, 2019

(30) Foreign Application Priority Data

Jul. 29, 2016 (FR) ........................................ 1657371

(51) Int. Cl.
*F28F 13/06* (2006.01)
*F28D 7/00* (2006.01)
(Continued)

(52) U.S. Cl.
CPC ......... *F28D 7/0091* (2013.01); *B01D 1/0041* (2013.01); *B01D 1/0052* (2013.01);
(Continued)

(58) Field of Classification Search
CPC ........ F28D 7/0091; F28D 7/0066; F28D 7/16; F28D 2021/0064; B01D 1/0041;
(Continued)

(56) References Cited

U.S. PATENT DOCUMENTS

2012/0018133 A1 *    1/2012   Postma ..................... F28F 1/14
165/104.21

OTHER PUBLICATIONS

International Search Report and Written Opinion of the Searching Authority dated Nov. 20, 2017 issued in corresponding International Application No. PCT/EP2017/068836.
(Continued)

*Primary Examiner* — Len Tran
*Assistant Examiner* — Kamran Tavakoldavani
(74) *Attorney, Agent, or Firm* — Locke Lord LLP; Alan B. Clement

(57) ABSTRACT

A tube heat exchanger extending in a vertical direction, comprising:
- a first chamber including a lower portion provided with at least one intake inlet for a diphasic fluid including a liquid and a first vapor containing a mist; an upper portion; and a first recovery member passed through by the first vapor and recovering the mist in liquid form, the first vapor next arriving in the upper portion,
- a central chamber forming liquid films running over the tubes and vaporizing at least partially to produce a second vapor, the tubes being traveled inwardly by a fluid hotter than the diphasic fluid, and
- a second chamber receiving the first vapor and the second vapor to form a third vapor, and including an outlet for the non-vaporized liquid and an outlet for the third vapor, the first chamber and the second chamber together forming a volume surrounding the central chamber around the vertical direction.

17 Claims, 6 Drawing Sheets

Figure 1:
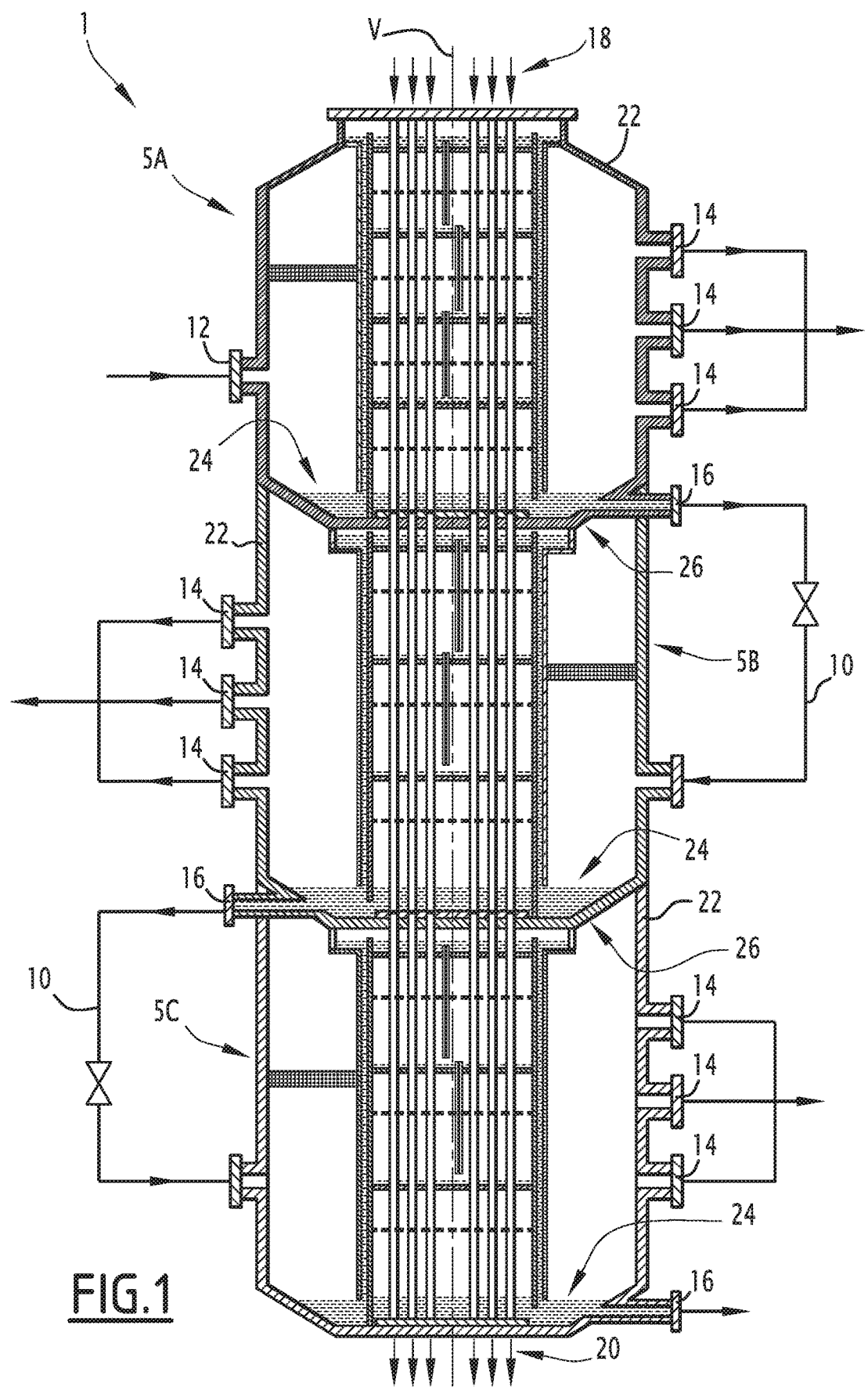

(51) Int. Cl.
*F25J 5/00* (2006.01)
*F28D 7/16* (2006.01)
*F28F 25/08* (2006.01)
*B01D 1/00* (2006.01)
*B01D 5/00* (2006.01)
*F28F 25/02* (2006.01)
*B01D 1/06* (2006.01)
*F28D 21/00* (2006.01)

(52) U.S. Cl.
CPC ........... *B01D 1/0088* (2013.01); *B01D 1/065* (2013.01); *B01D 5/006* (2013.01); *F25J 5/002* (2013.01); *F28D 7/0066* (2013.01); *F28D 7/16* (2013.01); *F28F 25/02* (2013.01); *F28F 25/085* (2013.01); *F25J 2250/04* (2013.01); *F25J 2270/12* (2013.01); *F25J 2270/60* (2013.01); *F25J 2290/32* (2013.01); *F28D 2021/0064* (2013.01)

(58) Field of Classification Search
CPC .... B01D 1/0052; B01D 1/0088; B01D 1/065; B01D 5/006; B01D 19/0031; F28F 25/02; F28F 25/085; F25J 5/002; F25J 2250/04; F25J 2270/12; F25J 2270/60; F25J 2290/32
See application file for complete search history.

(56) References Cited

OTHER PUBLICATIONS

Search Report and Written Opinion issued in FR1657371 dated Mar. 24, 2017.

\* cited by examiner

ID NO. FR 1657371

VERTICAL TUBE HEAT EXCHANGER AND METHOD FOR EXCHANGING HEAT

CROSS-REFERENCE TO RELATED APPLICATIONS

This application is a U.S. National Stage application under 35 U.S.C. 371 of International Application No. PCT/EP2017/068836 filed Jul. 26, 2017, which claims the benefit of and priority to French Patent Application No. FR 1657371 filed on Jul. 29, 2016. The contents of these above referenced patent applications are hereby incorporated by reference in their entirety.

BACKGROUND OF THE INVENTION

Field of the Invention

The present invention relates to a tube heat exchanger suitable for a diphasic fluid including at least one liquid and its vapor, for example a diphasic mixture of liquid and gaseous propane.

The invention also relates to an assembly comprising several heat exchangers of this type.

The invention also relates to a heat exchange method capable of being implemented in such a heat exchanger.

Description of Related Art

In the field of heat exchanges between a diphasic fluid and a hotter fluid, it is known to use horizontal tube exchangers traveled by the hottest fluid. Such exchangers are for example used in a propane refrigeration cycle, in which the exchangers are used to evaporate the liquid propane.

However, such exchangers are bulky, since they have a substantial footprint, especially when they are used cascading.

One aim of the invention is therefore to provide an exchanger making it possible to reduce the footprint, while having a good thermal efficiency.

BRIEF SUMMARY OF THE INVENTION

To that end, the invention relates to a heat exchanger having tubes intended to extend substantially in a vertical direction, the exchanger comprising:
  a first chamber including a lower portion provided with at least one intake inlet for a diphasic fluid including at least one liquid and a first vapor containing a mist, an upper portion, and a first recovery member suitable for being passed through by the first vapor and for recovering the mist in the form of a liquid phase returned to the lower portion, the first vapor next arriving in the upper portion,
  a central chamber including the tubes and being suitable for being supplied with said liquid from a liquid bath situated in the lower portion of the first chamber and for forming liquid films running over outer faces of the tubes and vaporizing at least partially to form a second vapor, the tubes being traveled inwardly by a fluid hotter than the diphasic fluid, and
  a second chamber provided to cover the first vapor coming from the upper portion of the first chamber and the second vapor, and to form a third vapor, the second chamber preferably including a second recovery member suitable for being passed through by the second vapor and recovering a mist contained in the second vapor, the second chamber including at least one outlet for the non-vaporized liquid, and at least one outlet for the third vapor,
  the first chamber and the second chamber together forming a volume surrounding the central chamber around the vertical direction.

According to specific embodiments, the heat exchanger comprises one or more of the following features, considered according to all technically possible combinations:
  in section in a horizontal plane, the first chamber and the second chamber are delimited radially outwardly by outer enclosures forming a circle, the outer enclosures preferably being semicircular, and the first chamber is radially inwardly delimited by an inner enclosure forming a circle portion, preferably a semicircle;
  the first recovery member forms a substantially horizontal plate separating the lower portion and the upper portion of the first chamber, and/or the optional second recovery member forms, in section in a horizontal plane, a circle portion, preferably semicircular, and radially outwardly delimits a part of the central chamber;
  the first chamber is radially inwardly delimited by a tight inner enclosure suitable for separating the liquid bath and the central chamber, the first chamber including at least one channel suitable for plunging into the liquid bath and fluidly connecting the liquid bath to an inlet of the central chamber, or the exchanger comprises a compressor for raising liquid from the liquid bath toward an inlet of the central chamber;
  the central chamber comprises one or several substantially horizontal plates suitable for distributing the liquid among the tubes and forming the liquid films, the plates defining passage orifices passed through by the tubes, the central chamber preferably including sleeves containing a metal foam, the sleeves extending radially between the tubes and the plate(s) to homogenize each liquid film;
  the central chamber includes at least one grid holding at least some of the tubes, the exchanger including cups fastened on the tubes in question by the holding to recover the liquid films disrupted by the holding grid, each cup defining a passage orifice to form a new liquid film, the central chamber preferably including secondary sleeves containing a metal foam, each secondary sleeve extending radially between one of the tubes in question and one of the cups to homogenize the new liquid film; and
  the central chamber comprises a liquid collector to receive the liquid, and additional hoses extending from the liquid collector downward, preferably vertically, and being suitable for inwardly receiving the liquid and forming liquid jets toward the tubes, the additional hoses preferably including a helical outer structure around the vertical direction forming fins suitable for recovering the liquid jets, the liquid films running over the outer structure.

The invention also relates to an assembly comprising several heat exchangers as described above, the exchangers being superimposed in the vertical direction, the assembly preferably including a system of cascading channels to connect the heat exchangers to one another.

According to one particular embodiment, the assembly is such that the heat exchangers have outer enclosures suitable for defining fixed relative positions of the heat exchangers with respect to one another once superimposed.

The invention lastly relates to a heat exchange method implementing tubes extending substantially in a vertical direction, the method comprising the following steps:

providing a central chamber including the tubes, as well as a first chamber and a second chamber together forming a volume surrounding the central chamber around the vertical direction, allowing, into a lower portion of the first chamber, a diphasic fluid including at least one liquid and a first vapor containing a mist, crossing, by the first mist, of a first recovery member to recover the mist in the form of a liquid phase returned toward the lower portion, the first mist next arriving in an upper portion of the first chamber, supplying said liquid to the central chamber from a liquid bath situated in the lower portion of the first chamber, forming liquid films running over outer faces of the tubes and vaporizing at least partially to form a second vapor, the tubes being traveled inwardly by a fluid hotter than the diphasic fluid, receiving, in the second chamber, the first vapor coming from the upper portion of the first chamber and the second vapor, and forming a third vapor, removing non-vaporized liquid via at least one outlet of the second chamber, and removing third vapor via at least one outlet of the second chamber, and optionally, crossing of a second recovery member, situated in the second chamber, by the second vapor and recovery of a mist contained in the second vapor.

BRIEF DESCRIPTION OF THE SEVERAL
VIEWS OF THE DRAWING(S)

Figure 2:
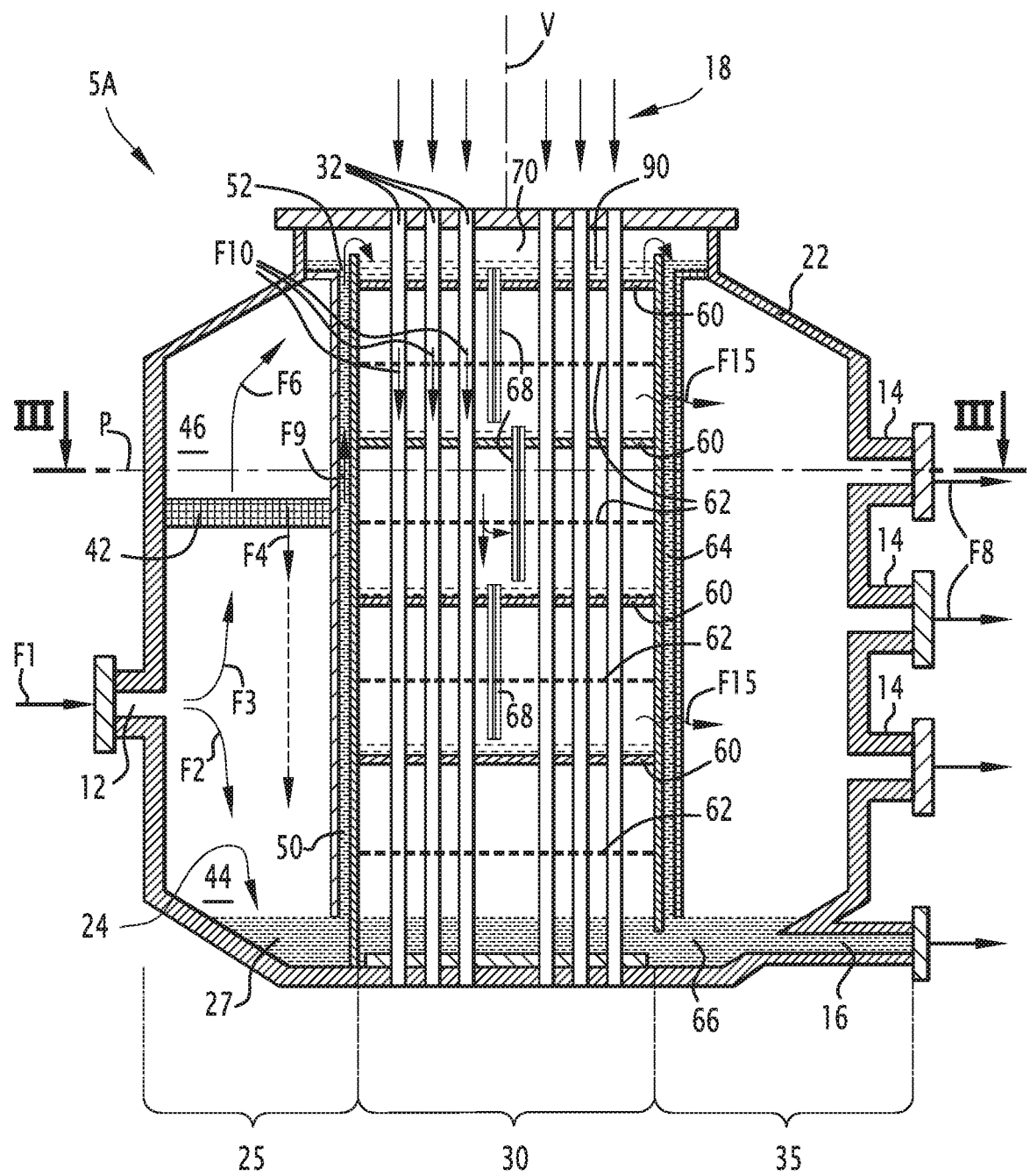
Figure 3:
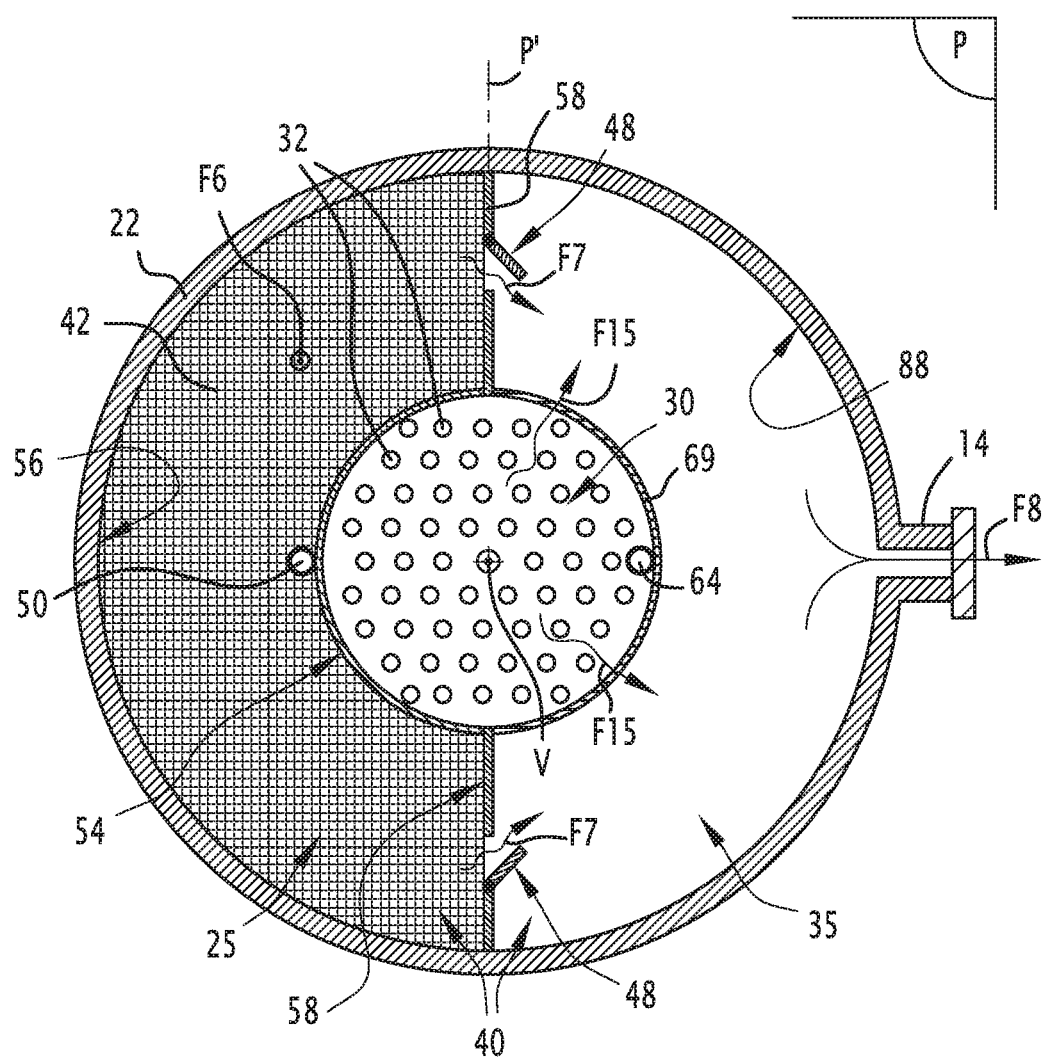
Figure 4:
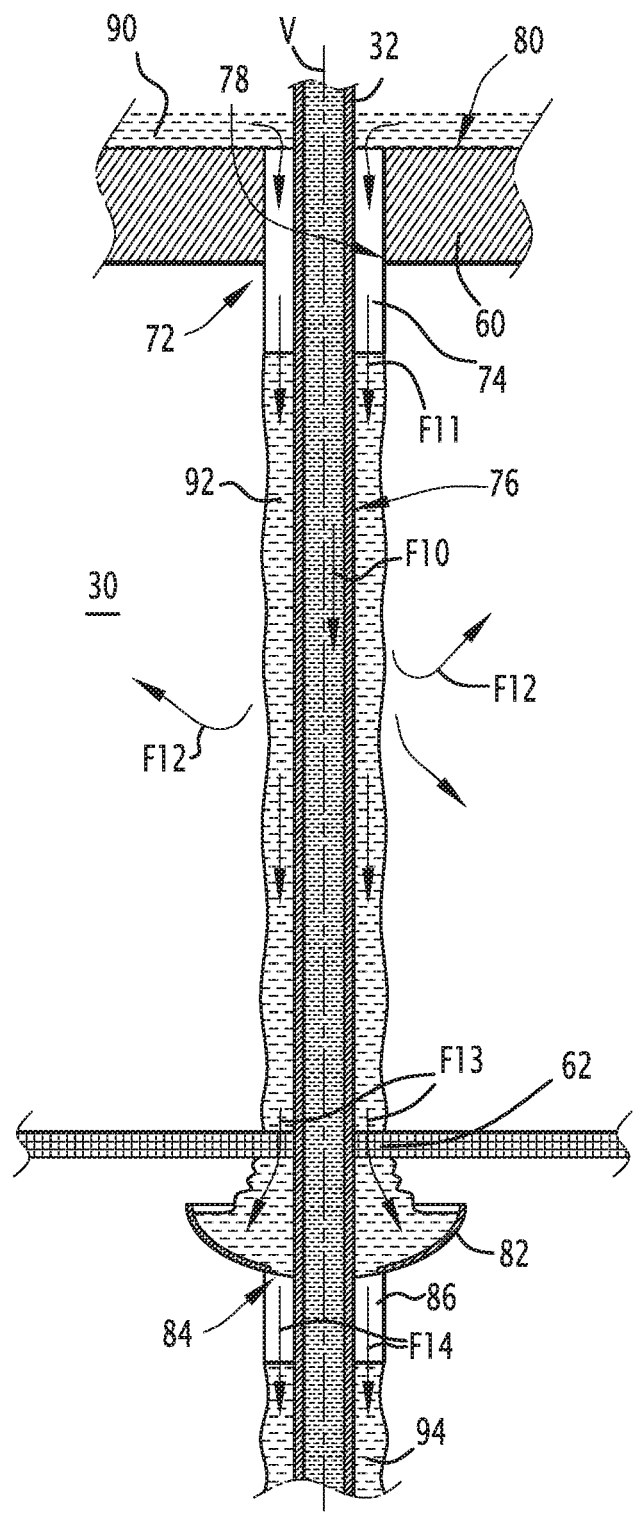
Figure 5:
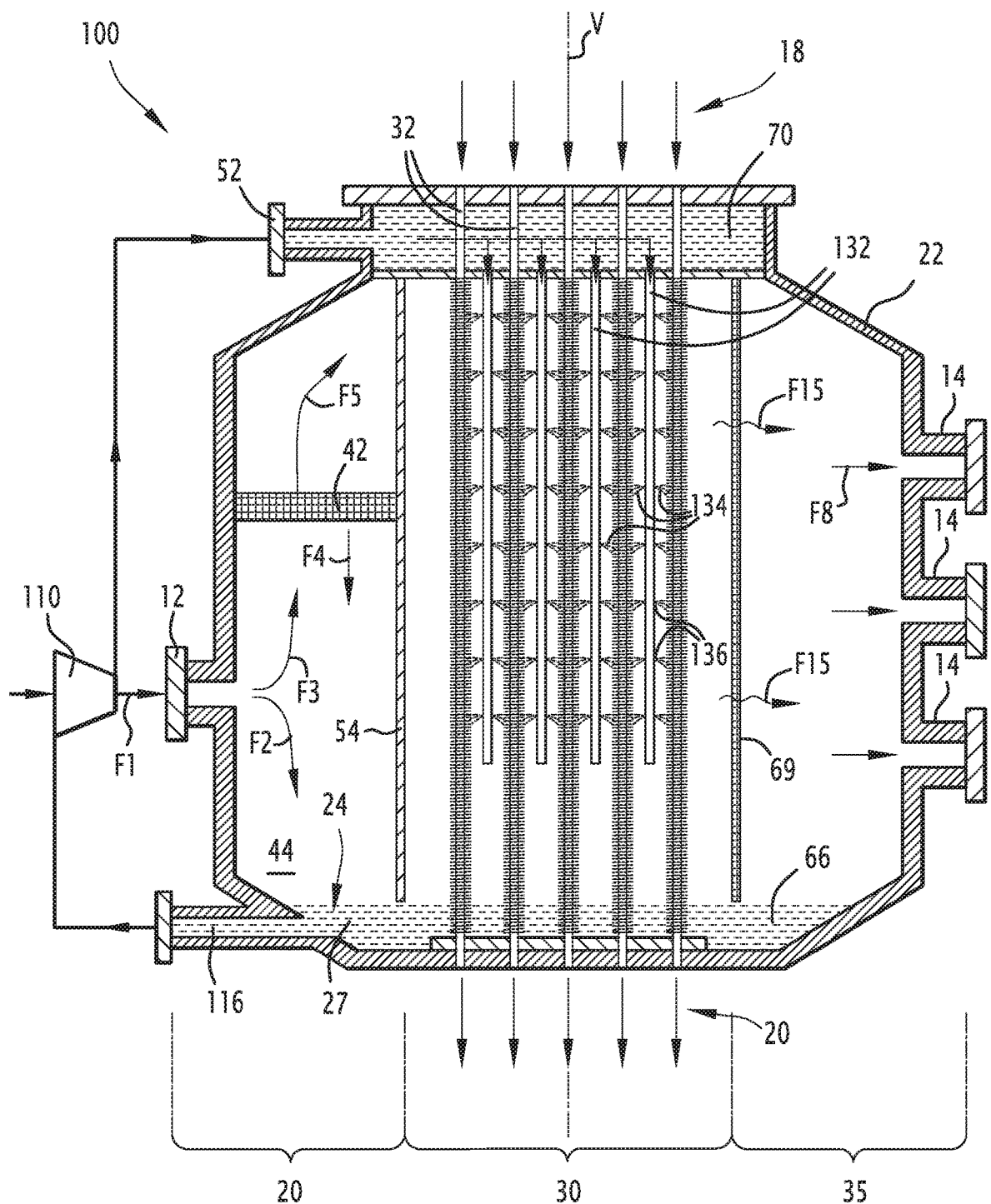
Figure 6:
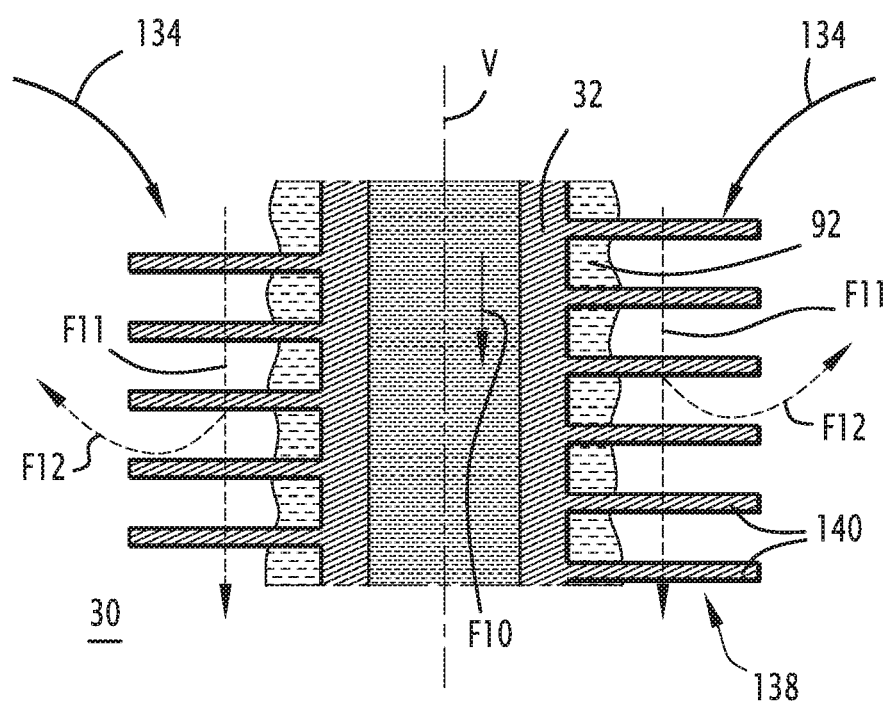

The invention will be better understood from the following description, provided solely as an example and done in reference to the appended drawings, in which:

FIG. 1 is a schematic, vertical sectional view of an assembly according to the invention including several heat exchangers according to a first embodiment, FIG. 2 is a vertical sectional view of the uppermost exchanger in FIG. 1, FIG. 3 is a schematic sectional view in a horizontal plane of the exchanger shown in FIGS. 1 and 2, FIG. 4 is a schematic, vertical sectional view of a vertical tube situated in the exchanger shown in FIGS. 1 to 3, FIG. 5 is a schematic, sectional view in a vertical plane, of an exchanger according to a second embodiment of the invention, and FIG. 6 is a detail view of a portion of a vertical tube of the exchanger shown in FIG. 5.

DETAILED DESCRIPTION OF THE
INVENTION

An assembly 1 according to a first embodiment of the invention is described in reference to FIG. 1.

The assembly 1 comprises three heat exchanges 5A, 5B, 5C superimposed in a vertical direction V, and advantageously a system of channels 10.

According to alternatives that are not shown, the assembly 1 includes only two exchangers, or more than three superimposed exchangers.

Each of these heat exchangers 5A, 5B, 5C comprises an intake inlet 12 for a diphasic fluid including at least one liquid and a first vapor, outlets 14 for a vapor, and an outlet 16 for non-vaporized liquid.

The assembly 1 also comprises inlets 18 for allowing, into the assembly 1, a fluid hotter than the diphasic fluid, and outlets 20 for said fluid.

The channel system 10 fluidly connects the outlet 16 of the exchanger 5A to the inlet 12 of the exchanger 5B, and the outlet 16 of the exchanger 5B to the inlet 12 of the exchanger 5C.

In the illustrated example, the inlets 18 are situated at the apex of the assembly 1, while the outlets 20 are situated at the foot of the assembly.

Each exchanger 5A, 5B, 5C has an outer enclosure 22, the outer enclosures having complementary shapes suitable for defining fixed relative positions of the heat exchangers 5A, 5B, 5C relative to one another once superimposed.

For example, the outer enclosures 22 define, in the lower part of each heat exchanger 5A, 5B, 5C, a vessel 24, the vessels of the heat exchangers 5A and 5B being received respectively in the vertical direction V in receptacles 26 formed by the outer enclosures 22 of the heat exchangers 5B and 5C.

In order to facilitate the connection by the channel system 10, the inlet 12 of the exchanger 5B is situated radially relative to the vertical direction V opposite the inlets 12 of the heat exchangers 5A, 5C. Likewise, the outlets 14 of the heat exchanger 5B are situated opposite the outlets 14 of the heat exchangers 5A, 5C.

The heat exchangers 5A, 5B, 5C also being substantially structurally similar to one another, only the heat exchanger 5A will be described in detail hereinafter in reference to FIGS. 2 and 3.

The diphasic fluid is for example propane.

The hottest fluid is for example a mixed refrigerant or a feed gas.

As shown in FIGS. 2 and 3, the heat exchanger 5A comprises a first chamber 25 for receiving the diphasic fluid through the inlet 12 and forming a liquid bath 27 in a part of the vessel 24, a central chamber 30 including a plurality of substantially vertical tubes 32 and suitable for being supplied from the liquid bath 27 and vaporizing the liquid at least partially, and a second chamber 35 provided to receive vapor coming from the first chamber and the central chamber, the first chamber and the second chamber together forming a volume 40 surrounding the central chamber around the vertical direction V.

The first chamber 25 comprises a first recovery member 42 that separates it into a lower portion 44 including the inlet 12 and the liquid bath 27, and an upper portion 46 in fluid communication with the second chamber 35 via self-regulating orifices 48.

The first chamber 25 also comprises a channel 50 suitable for plunging into the liquid bath 27 and for fluidly connecting the liquid bath to an inlet 52 of the central chamber 30.

The first chamber 25 has, in section in a substantially horizontal plane P, a semi-annular shape. The first chamber 25 is delimited radially inwardly by an inner enclosure 54 that is advantageously semicircular in section in the plane P and vertical. The first chamber 25 is delimited radially outwardly by an outer enclosure 56, advantageously semicircular in section in the plane P, and advantageously belonging to the outer enclosure 22 of the exchanger 5A.

The first recovery member 42 extends radially from the inner enclosure 54 to the outer enclosure 56 and advantageously forms a substantially horizontal plate. The first recovery member 42 extends angularly around the vertical direction V between two partitions 58 separating the first chamber 25 and the second chamber 35.

The partitions 58 advantageously extend in a vertical plane P' and include the self-regulating orifices 48.

The channel 50 for example extends vertically and is advantageously located against the inner enclosure 54.

The first recovery member 42 is suitable for being passed through by a first vapor charged with mist coming from the lower portion 44 and returning a liquid phase toward the inner portion. The first recovery member 42 comprises a material known by those skilled in the art and described, for example, in documents U.S. Pat. Nos. 3,997,303 and 7,105,036. Such a material defines winding passages allowing coalescence of the droplets of mist and their return by gravity toward the lower portion 44.

According to alternatives that are not shown, the first chamber 25 is not semicircular, but extends angularly around the vertical direction V by an angle of less than 180°, or more than 180°.

According to other alternatives that are not shown, the first chamber 25 is not delimited radially by circular enclosures (circle portions), but has a noncircular shape.

The central chamber 30 has a circular general shape in section in the plane P in the illustrated example. It is passed all the way through by the tubes 32. The central chamber 30 advantageously comprises several substantially horizontal plates 60 suitable for distributing the liquid between the tubes 32.

The central chamber 30 also advantageously comprises holding grates 62 for holding the tubes 32, a channel 64 suitable for discharging a liquid overflow on the highest plate 60 toward a liquid bath 66 that may appear at the bottom of the central chamber and the second chamber 35, and intermediate overflow channels 68 suitable for pouring a liquid overflow onto one of the plates 60 toward the plate situated immediately below.

The plates 60 are advantageously regularly spaced apart in the vertical direction V.

In the illustrated example, there are four plates 60 in the heat exchanger 5A, and three in the heat exchangers 5B and 5C.

According to alternatives that are not shown, there may be a single plate, two, three or more than four plates.

The highest plate 60 defines a liquid collector 70 in the central chamber 30, the liquid collector being fluidly connected to the liquid bath 27 by the channel 50 and to the liquid bath 66 by the overflow channel 64.

The central chamber 30 is delimited radially outwardly, on the one hand, by the inner enclosure 54 of the first chamber 25, and on the other hand, by a second recovery member 69 advantageously with a semi-cylindrical shape, and for example arranged vertically.

As shown in FIG. 4, each plate 60 defines passage orifices 72 passed through by the tubes 32.

Sleeves 74 containing a metal foam are advantageously installed around tubes 32 in the passage orifices 72.

The sleeves 74 extend radially from an outer surface 76 of the tubes 32 to an edge 78 of the passage orifice 72.

For example, each sleeve 74 extends vertically from an upper surface 80 of one of the plates 60, and advantageously protrudes downward from said plate.

The metal foam is for example an aluminum foam such as the Duocel® foam marketed by the company ERG Aerospace Corporation.

The holding grates 62 (FIG. 2) are for example substantially horizontal. The holding grates 62 are advantageously regularly vertically spaced apart. Each holding grate 62 is for example situated substantially at an equal distance from two of the plates 60, except the lowermost grate 62, which is situated at an equal distance from the lowermost plate 60 and the outer enclosure 22.

As shown in FIG. 4, the holding grates 62 touch at least some of the tubes 32.

Advantageously, cups 82 are fastened on the tubes 32 below contact zones between the holding grates 62 and the tubes. The cups 82 are open upwardly so as to be able to recover liquid moving radially away from one of the tubes 32, and defining a passage orifice 84 for the tubes 32 and the liquid.

Advantageously, secondary sleeves 86 containing a metal foam are arranged around tubes 32 immediately below the orifice 84. The additional sleeves 86 are for example made from the same material as the sleeves 74.

The second chamber 35 is for example delimited radially inwardly by the second recovery member 69, and radially outwardly by an outer enclosure 88, advantageously substantially semicircular in the plane P.

The outer enclosures 56 and 88 together form a vertical cylinder over at least part of their height.

The outlets 14 are advantageously distributed regularly vertically in the second chamber 35.

The outlet 16 is situated vertically at the liquid bath 66.

The operation of the assembly 1 will now be described.

Each of the heat exchangers 5A, 5B, 5C operates similarly, except that the heat exchanger 5A operates at a high pressure, for example between 3 and 5 absolute bars, while the heat exchanger 5B operates at a medium pressure, for example between 2 and 3 absolute bars, and the heat exchanger 5C operates at a low pressure, for example between 1 and 2 absolute bars.

Only the operation of the heat exchanger 5A will therefore be described in detail hereinafter.

As shown in FIG. 2, the diphasic fluid (arrow F1) is allowed through the inlet 12 into the lower portion 44 of the first chamber 25 of the exchanger 5A. A first separation occurs between the liquid and the first vapor. The liquid (arrow F2) falls into the liquid bath 27 that has formed in the vessel 24. The first vapor (arrow F3) rises under the effect of the pressure and passes through the first recovery member 42.

The first recovery member 42 recovers the mist contained in the first vapor and returns it in liquid form (arrow F4) toward the liquid bath 27. In FIG. 2, the arrow F4 is symbolic, since the recovery of the mist is done in the form of droplets that are not necessarily channeled and can fall back as rain into the lower portion 44.

The first recovery member 42 advantageously recovers about 99.5% by weight of the mist contained in the first vapor.

The first vapor, rid of the mist, penetrates the upper portion 46 (arrow F6). Then, it crosses, advantageously on each side of the central chamber 30, the partitions 58 through the self-regulating orifices 48 (FIG. 3, arrows F7). The first vapor then finds itself in the second chamber 35 and leaves through the outlets 14 (arrow F8).

As shown in FIG. 2, the liquid bath 27 experiences, on its surface, the pressure of the diphasic fluid entering the heat exchanger 5A and rises, in the channel 50 (arrow F9) to arrive in the liquid collector 70 located at the top of the central chamber 30.

The hotter fluid is introduced into the heat exchanger 5A through the inlets 18 and flows vertically, here from top to bottom, in the tubes 32 (arrows F10). The hotter fluid next enters the heat exchanger 5B, the tubes 32 of which it travels, then the heat exchanger 5C. The hotter fluid leaves the assembly 1 through the outlets 20 (FIG. 1).

In the liquid collector 70, the liquid forms a bath 90 (FIG. 4) above the highest plate 60. In case of overflow, the bath 90 optionally flows through one of the intermediate overflow channels 68 and is found directly on the plate 60 situated immediately below. In case of more significant overflow, the liquid bath 90 flows through the channel 64 and arrives in the liquid bath 66 situated below the central chamber 30 and the second chamber 35.

The liquid bath 66 flows outside the heat exchanger 5A through the outlet 16 (FIG. 2).

As shown in FIG. 4, the liquid bath 90 is distributed around each tube 32 and flows through the orifices 72. The liquid passes through the sleeves 74, which creates a homogeneous liquid film 92 on the outer surface 76 of each tube 32. The liquid film 92 flows vertically (arrow F11) while heating up, the tubes 32 being heated inwardly by the hotter fluid. The liquid film 92 evaporates at least partially (arrows F12) to give rise to a second vapor within the central chamber 30.

When the liquid film 92 optionally encounters one of the holding grates 62 (arrow F13), the liquid film is disrupted. The cups 82 recover the liquid, including if the latter has moved radially away from the tube 32 due to the holding grate 62. The recovered liquid flows through the orifice(s) 84 of the cup 82, and passes through the additional sleeve 86 (arrow F14) to again form a homogeneous liquid film 94 flowing along the tube 32. The non-evaporated liquid thus flows to the following plate 60.

The operation of each plate 60 being similar, the non-evaporated liquid is found in fine in the liquid bath 66 at the bottom of the central chamber 30, and passes in the second chamber 35 to leave through the outlet 16 (FIG. 2).

The second vapor having appeared in the central chamber 30, under the effect of the pressure, passes through (arrows F15) the second recovery member 69. The mist optionally contained in the second vapor is recovered in liquid form and flows to the liquid bath 66. The second vapor then finds itself in the second chamber 35 and mixes with the first vapor before leaving the heat exchanger 5A through the outlets 14.

As shown in FIG. 1, the liquid having left through the outlet 16 is sent by the system of channels 10 to the inlet 12 of the heat exchanger 5B, which forms a new diphasic fluid that undergoes, in said exchanger, the same steps as the diphasic fluid in the heat exchanger 5A, but at a lower pressure, which is the average pressure.

Thus, the liquid, over the course of the stages and heat exchangers, vaporizes gradually over the tubes 32 to form a vapor recovered in fine at the outlets 14 of the heat exchanger 5C. Any non-vaporized liquid portion is collected at the outlet 16 of the exchanger 5C.

The hottest fluid has cooled gradually while passing through the tubes 32 of the heat exchangers 5A to 5C. It leaves cooled through the outlets 20 at the bottom of the heat exchanger 5C.

In reference to FIGS. 5 and 6, a heat exchanger 100 is described according to a second embodiment of the invention. The heat exchanger 100 is similar to the heat exchanger 5A shown in FIGS. 1 to 4. The similar elements bear the same numerical references and will not described again. Only the differences will be described in detail below.

In the illustrated example, the heat exchanger 100 is not stacked vertically with similar exchangers. According to an alternative that is not shown, it is stacked with similar heat exchangers.

It comprises an outlet 116 (FIG. 5) that is not situated on the side of the second chamber 35, but on the side of the first chamber 25 to cause liquid coming from the liquid bath 27 to exit. The heat exchanger 100 further comprises a compressor 110 in order to compress the liquid coming from the outlet 116 and inject it through the inlet 52 in the liquid collector 70.

The central chamber 30 comprises additional hoses 132 extending vertically from the liquid collector 70 downward to inwardly receive the liquid coming from the liquid collector 70.

The additional hoses 132 are suitable for forming outer liquid jets 134 toward the tubes 32. For example, the additional hoses 132 include orifices 136 regularly vertically spaced apart.

The tubes 32 advantageously include a helical outer structure 138 around the vertical direction V and forming fins 140 suitable for recovering the liquid jets 134.

The operation of the exchanger 100 is similar to that of the heat exchanger 5A. Only the differences will be described in detail below.

The liquid of the liquid bath 27 does not rise in the liquid collector 70 through a channel 50, but leaves through the outlet 116 to be injected by the compressor 110 into the inlet 52.

The liquid present in the liquid collector 70 does not use orifices on a plate, but enters into the additional hoses 132 in order to form the liquid jets 134.

The liquid jets 134 strike the outer structure 138 of the tubes 32 (FIG. 6) and are recovered by the latter to form the liquid film 92. The liquid film 92 runs over the helical structure (arrow F11) and vaporizes at least partially (arrow F12) to form the second vapor in the central chamber 30.

The non-vaporized liquid is found in the liquid bath 66, which communicates with the liquid bath 27. Likewise, the liquid recovered by the second recovery member 69 from the mist potentially present in the second vapor is found in the liquid bath 66, then in the liquid bath 27.

Optionally, the compressor 110 is also used to inject the diphasic fluid into the inlet 12 (arrow F1).

Owing to the features described above, the assembly 1 and the heat exchanger 100 are very compact and have a small footprint. Furthermore, they are easy to manufacture and have a high thermal efficiency. They advantageously assume the form of one or several modules able to be standardized.

The first recovery member 42 and any second recovery member 69 make it possible to eliminate a certain number of pieces of equipment from the production line (for example: the balloon before the compressor in a refrigeration cycle) that would be recommended, or even necessary, without these recovery members.

The optional holding grates 62 effectively hold the tubes 32 and advantageously avoid vibrations.

The optional cups 82 make it possible to reduce the disruptive effects of the holding grates 82.

The sleeves 74 and the additional sleeves 86, which are also optional, provide a homogeneous distribution of the liquid films 92, 94 around tubes 32.

The invention claimed is:

1. A heat exchanger having tubes intended to extend substantially in a vertical direction, the exchanger comprising:
 a first chamber including
  a lower portion provided with at least one intake inlet for a diphasic fluid including at least one liquid and a first vapor containing a mist, an upper portion, and
  a first recovery member suitable for being passed through by the first vapor and for recovering the mist in the form of a liquid phase returned toward the lower portion, the first vapor next arriving in the upper portion,
a central chamber including the tubes and being suitable for being supplied with said liquid from a liquid bath situated in the lower portion of the first chamber and for forming liquid films running over outer faces of the tubes and vaporizing at least partially to form a second vapor, the tubes being traveled inwardly by a fluid hotter than the diphasic fluid, and
a second chamber provided to cover the first vapor coming from the upper portion of the first chamber and the second vapor, and to form a third vapor, the second chamber including at least one outlet for the non-vaporized liquid, and at least one outlet for the third vapor,
the first chamber and the second chamber together forming a volume surrounding the central chamber around the vertical direction.

2. The heat exchanger according to claim 1, wherein, in section in a horizontal plane:
the first chamber and the second chamber are delimited radially outwardly by outer enclosures forming a circle, the first chamber is radially inwardly delimited by an inner enclosure forming a circle portion.

3. The heat exchanger according to claim 1, wherein:
the first recovery member forms a substantially horizontal plate separating the lower portion and the upper portion the first chamber, and/or
an optional second recovery member forms, in section in a horizontal plane, a circle portion and radially outwardly delimits a part of the central chamber.

4. The heat exchanger according to claim 1, wherein:
the first chamber is radially inwardly delimited by a tight inner enclosure suitable for separating the liquid bath and the central chamber, the first chamber including at least one channel suitable for plunging into the liquid bath and for fluidly connecting the liquid bath to an inlet of the central chamber, or
the exchanger comprises a compressor for raising liquid from the liquid bath toward an inlet of the central chamber.

5. The heat exchanger according to claim 1, wherein the central chamber comprises one or several substantially horizontal plates suitable for distributing the liquid among the tubes and forming the liquid films, the horizontal plates defining passage orifices passed through by the tubes.

6. The heat exchanger according to claim 5, wherein the central chamber includes at least one grid holding at least some of the tubes, the exchanger including cups fastened on the tubes in question to recover the liquid films disrupted by the grid, each cup defining a passage orifice to form a new liquid film.

7. The heat exchanger according to claim 1, wherein the central chamber comprises a liquid collector to receive the liquid, and additional hoses extending from the liquid collector downward and being suitable for inwardly receiving the liquid and forming liquid jets toward the tubes.

8. An assembly comprising several heat exchangers, each of the several heat changers constructed according to claim 1, the heat exchangers being superimposed in the vertical direction.

9. The assembly according to claim 8, wherein the heat exchangers have outer enclosures suitable for defining fixed relative positions of the heat exchangers with respect to one another once superimposed.

10. The heat exchanger according to claim 1, wherein the second chamber includes a second recovery member suitable for being passed through by the second vapor and recovering a mist contained in the second vapor.

11. The heat exchanger according to claim 2, wherein:
the outer enclosures is semicircular, and
said circle portion is a semicircle.

12. The heat exchanger according to claim 5, wherein the central chamber includes sleeves containing a metal foam, the sleeves extending radially between the tubes and the horizontal plate(s) to homogenize each liquid film.

13. The heat exchanger according to claim 6, wherein the central chamber includes secondary sleeves containing a metal foam, each secondary sleeve extending radially between one of the tubes in question and one of the cups to homogenize the new liquid film.

14. The heat exchanger according to claim 7, wherein the additional hoses include a helical outer structure around the vertical direction forming fins suitable for recovering the liquid jets, the liquid films running over the helical outer structure.

15. The assembly according to claim 8, further including a system of cascading channels to connect the heat exchangers to one another.

16. A heat exchange method implementing tubes extending substantially in a vertical direction, the method comprising:
providing a central chamber including the tubes, as well as a first chamber and a second chamber together forming a volume surrounding the central chamber around the vertical direction,
allowing, into a lower portion of the first chamber, a diphasic fluid including at least one liquid and a first vapor containing a mist,
crossing, by the first mist, of a first recovery member to recover the mist in the form of a liquid phase returned toward the lower portion, the first mist next arriving in an upper portion of the first chamber,
supplying said liquid to the central chamber from a liquid bath situated in the lower portion of the first chamber,
forming liquid films running over outer faces of the tubes and vaporizing at least partially to form a second vapor, the tubes being traveled inwardly by a fluid hotter than the diphasic fluid,
receiving, in the second chamber, the first vapor coming from the upper portion of the first chamber and the second vapor, and forming a third vapor, and
removing non-vaporized liquid via at least one outlet of the second chamber, and removing third vapor via at least one outlet of the second chamber.

17. A heat exchange method as recited in claim 16, further comprising crossing of a second recovery member, situated in the second chamber, by the second vapor and recovery of a mist contained in the second vapor.

* * * * *